US005894004A

United States Patent [19]

Wagner et al.

[11] Patent Number: 5,894,004

[45] **Date of Patent: *Apr. 13, 1999**

[54] METHOD FOR MANUFACTURING MAGNETIC ROLLS

[75] Inventors: Jennifer R. Wagner, Walworth; David C. Irving, Avon, both of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,106

[22] Filed: Nov. 20, 1996

[51] Int. Cl.[6] .......... B29C 35/02

[52] U.S. Cl. .......... 264/40.1; 264/406; 264/427

[58] Field of Search .......... 264/406, 427, 264/259, 40.1

[56] References Cited

U.S. PATENT DOCUMENTS

| | | | |
|---|---|---|---|
| 4,517,719 | 5/1985 | Okumura et al. | 29/124 |
| 4,557,582 | 12/1985 | Kan et al. | 355/3 DD |
| 4,604,042 | 8/1986 | Tanigawa et al. | 425/3 |
| 4,608,737 | 9/1986 | Parks et al. | 29/110 |
| 4,818,305 | 4/1989 | Steingroever | 148/103 |
| 4,823,102 | 4/1989 | Cherian et al. | 335/306 |
| 4,872,418 | 10/1989 | Yoshikawa et al. | 118/657 |
| 4,954,800 | 9/1990 | Ohtsuka | 335/284 |
| 5,019,796 | 5/1991 | Lee et al. | 335/302 |
| 5,030,937 | 7/1991 | Loubier et al. | 335/303 |
| 5,181,971 | 1/1993 | Ohtsuka | 148/103 |
| 5,384,957 | 1/1995 | Mohri et al. | 29/895.32 |
| 5,453,224 | 9/1995 | Kuroda | 264/427 |

*Primary Examiner*—Christopher A. Fiorilla
*Attorney, Agent, or Firm*—John S. Wagley

[57] ABSTRACT

A mold for use in a molding machine for manufacturing a magnetic roll for use in an electrophotographic printing machine of the type having an electrostatic latent image recorded on a photoconductive member is provided. The mold includes a body and an insert. The body defines a surface of the body. The insert is positioned at least partially against the surface of the body. The insert defines an inner surface of the insert. The inner surface is adapted to conform to at least a portion of the periphery of the roll. The insert may be replaced when worn and the body may be reused with a replacement insert.

9 Claims, 6 Drawing Sheets

METHOD FOR MANUFACTURING MAGNETIC ROLLS

The present invention relates to a method and apparatus for developing a latent image. More specifically, the invention relates to a magnetic roll for development systems.

The features of the present invention are useful in the printing arts and more particularly in electrophotographic printing. In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

In the process of electrophotographic printing, the step of conveying toner to the latent image on the photoreceptor is known as "development." The object of effective development of a latent image on the photoreceptor is to convey toner particles to the latent image at a controlled rate so that the toner particles effectively adhere electrostatically to the charged areas on the latent image. A commonly used technique for development is the use of a two-component developer material, which comprises, in addition to the toner particles are intended to adhere to the photoreceptor, a quantity of magnetic carrier granules or beads. The toner particles adhere triboelectrically to the relatively large carrier beads, which are typically made of steel. When the developer material is placed in a magnetic field, the carrier beads with the toner particles thereon form what is known as a magnetic brush, wherein the carrier beads form relatively long chains which resemble the fibers of a brush. This magnetic brush is typically created by means of a "developer roll." The developer roll is typically in the form of a cylindrical sleeve rotating around a fixed assembly of permanent magnets called a magnetic roll. The carrier beads form chains extending from the surface of the developer roll, and the toner particles are electrostatically attracted to the chains of carrier beads. When the magnetic brush is introduced into a development zone adjacent the electrostatic latent image on a photoreceptor, the electrostatic charge on the photoreceptor will cause the toner particles to be pulled off the carrier beads and onto the photoreceptor. Another known development technique involves a single-component developer, that is, a developer which consists entirely of toner. In a common type of single-component system, each toner particle has both an electrostatic charge (to enable the particles to adhere to the photoreceptor) and magnetic properties (to allow the particles to be magnetically conveyed to the photoreceptor). Instead of using magnetic carrier beads to form a magnetic brush, the magnetized toner particles are caused to adhere directly to a developer roll. In the development zone adjacent the electrostatic latent image on a photoreceptor, the electrostatic charge on the photoreceptor will cause the toner particles to be attracted from the developer roll to the photoreceptor.

As stated earlier, development is typically accomplished by the use of a magnetic brush. The magnetic brush is typically formed by a developer roll which is typically in the form of a cylindrical sleeve which rotates around a fixed assembly of permanent magnets. When utilizing magnetic brush-type development, the cylindrical sleeve is typically made of an electrically conductive, non-magnetically conductive material, for example, aluminum.

Prior art developer rolls for use with magnetic pressure development typically include a magnetic roll about which a sleeve is positioned. The magnetic roll may be held stationary and the sleeve rotates. The magnetic roll typically includes a plurality of poles for attracting the toner particles. These poles may be positioned on the periphery of the magnetic roll at such positions to obtain optimum transfer of the toner particles to the photoconductive surface of the drum.

Prior art developer rolls have typically been manufactured with a core or body and magnets positioned on the periphery of the core. Typically the magnets are glued to the periphery of the core. The gluing of magnets to a core contributes to a series of problems. The gluing leads to positioning errors both radially and tangentially, reducing the quality of the roll. Further, add cost may be required to perform subsequent machining of the periphery of the roll to obtain needed accurate tolerances.

More recently, magnetizable material is molded about a shaft to form a magnetic roll. The magnetizable material may be one of any suitable moldable materials but, preferably the materials include ferrite. Permanent magnets are imbedded in the mold and are positioned near the periphery of the mold cavity where the molded material is to be placed, in order that the magnetic field in the permanent magnets is transferred to the magnetizable material within the mold cavity.

The use of magnetizable material molded about a shaft is plagued with several problems. First, the wear of the mold during the molding process is substantial. The accelerated wear of the mold is attributable to the abrasive nature of the ferrite material within the mold cavity necessary to obtain the magnetizable properties of the molded material.

To prevent the mold material within the mold cavity from adhering to the permanent magnet within the die, preferably, the permanent magnet is separated from the molded material by a portion of the mold. Since the effective field of the permanent magnet is reduced as a square of the distance between the permanent magnet and the molded material, the portion of the mold between the molded material and the magnet must be kept to a minimum. Because the distance must be kept to a minimum, any appreciable wear of the mold is consequently unacceptable.

Further, the position of the poles within the magnetic roll is critical for the proper transfer of the toner within the development unit of the printing machine. The magnetic fields of the permanent magnets interact with each other within the mold making it impossible without complicated computer modeling to predict where to place the permanent magnets within the mold around the mold cavity in order to obtain a magnetic roll with poles positioned in particular locations.

Further, manufacturers may manufacture several different rolls, rolls with poles in various positions, yet all these rolls having the same length and diameter. Such differences in the positioning of the poles requires a separate expensive mold for each particular pole configuration and resulting change-over costs when manufacturing rolls with identical diameters and different pole positions.

The magnetic roll mold of the present invention is intended to alleviate at least some of the aforementioned problems.

The following disclosures may be relevant to various aspects of the present invention:

U.S. Pat. No. 5,453,224
Patentee: Kuroda
Issue Date: Sep. 26, 1995

U.S. Pat. No. 5,384,957
Patentee: Mohri et al.
Issue Date: Jan. 31, 1995

U.S. Pat. No. 5,181,971
Patentee: Ohtsuka
Issue Date: Jan. 26, 1993

U.S. Pat. No. 5,030,937
Patentee: Loubier et al.
Issue Date: Jul. 9, 1991

U.S. Pat. No. 5,019,796
Patentee: Lee et al.
Issue Date: May 28, 1991

U.S. Pat. No. 4,954,800
Patentee: Ohtsuka
Issue Date: Sep. 4, 1990

U.S. Pat. No. 4,872,418
Patentee: Yoshikawa et al.
Issue Date: Oct. 10, 1989

U.S. Pat. No. 4,823,102
Patentee: Cherian et al.
Issue Date: Apr. 18, 1989

U.S. Pat. No. 4,818,305
Patentee: Steingroever
Issue Date: Apr. 4, 1989

U.S. Pat. No. 4,608,737
Patentee: Parks et al.
Issue Date: Sep. 2, 1986

U.S. Pat. No. 4,604,042
Patentee: Tanigawa et al.
Issue Date: Aug. 5, 1986

U.S. Pat. No. 4,557,582
Patentee: Kan et al.
Issue Date: Dec. 10, 1985

U.S. Pat. No. 4,517,719
Patentee: Okumura et al.
Issue Date: May 21, 1985

U.S. Pat. No. 5,453,471 discloses a hollow member which serves as a cylinder having an inner configuration which matches the outer configuration of a magnet roller to be manufactured. The member is mounted in a metallic mold and then the metallic mold is clamped. A molten resin containing magnetic particles is injected into the mold cavity of the hollow member through a runner.

U.S. Pat. No. 5,384,957 discloses a method of producing a magnet roll in which a magnetic property comparable to that obtained by injection molding can be obtained in spite of an extrusion process. According to a first embodiment, the yoke width of the magnetic field extrusion die is varied along an extrusion direction. According to a second embodiment, a pipe filled with resin bonded magnet material is used as a shaft.

U.S. Pat. No. 5,181,971 discloses a method of manufacturing a magnet roller. The method includes the step of disposing a plurality of pairs of magnetic poles each having the starting magnetic pole and terminal magnetic pole of a magnetic line of force on the peripheral surface of a cavity in a metal mold in which a resin magnet is molded. The lines of flux are in parallel lines U.S. Pat. No. 5,030,937 discloses a magnet roll for an electrophotographic device. The roll includes a magnet carrier assembly constituted by a plurality of identical cylindrical segments of injection molded plastic material. The segments are coaxially arranged and longitudinally aligned in an end-to-end relationship on a spindle like metal rod constituting the magnet roll axis of rotation. The bottom of each channel has along its length a central groove that functions as a locator for an extruded magnetic strip.

U.S. Pat. No. 5,019,796 discloses an improved bar magnet and method of construction and an improved magnetic core. An assembly of magnet is shown for use in a processing station of a printing machine. The bar magnet is formed of permanent magnet material having magnetic domains therein that are magnetized along epicyclical curve segments. The external magnetic flux density is improved over that of a conventionally magnetized magnet.

U.S. Pat. No. 4,954,800 discloses a method of manufacturing a magnet roller. The method includes the step of disposing a plurality of pairs of magnetic poles each having the starting magnetic pole and terminal magnetic pole of a magnetic line of force on the peripheral surface of a cavity in a metal mold in which a resin magnet is molded. Magnets are positioned about the periphery of the mold to obtain specific lines of magnetic flux.

U.S. Pat. No. 4,872,418 discloses a magnet roll including a main body portion of a soft material and having a surface portion which is permanently magnetized. The roll also has a supporting portion integrally formed with the main body portion by the some soft materials a that of the main body portion for mounting the body portion to a member to which the main body is to be mounted.

U.S. Pat. No. 4,823,102 discloses a magnetic roll which is used in a processing station of a printing machine. The roll has a central portion with a plurality of spaced fins extending generally radially therefrom. A shaft extends outwardly from opposed ends of the central portion along the longitudinal axis thereof. A magnet is secured in each space between adjacent fins. A sleeve is rotatably supported on the shaft.

U.S. Pat. No. 4,818,305 discloses a process for manufacturing magnets. A second disk shaped magnets are placed in a mold against a first magnet. Pressure is applied axially to the magnets in the mold and are thereby combining the magnets under pressure. This process is repeated as additional magnets are added.

U.S. Pat. No. 4,804,971 discloses a cylindrical magnet for a magnetic brush development unit used in a printing machine. The magnet is of a U-shaped cross section having a cylindrical outer sleeve and a cavity through which extends the rotary axis of the sleeve. The material forming the magnet is a moldable plastic.

U.S. Pat. No. 4,608,737 discloses a magnet roll for use in a developer unit of an electrostatic copier having a magnet structure provided by elongated bars of permanent magnet material magnetized to provide radially oriented magnets. The bars are sufficiently rigid to support hubs without the need of a core. A cylindrical shell of conductive material is rotatably mounted on the magnet structure. The bars are made of conductive plastic, ceramic or rubber with a rigid steel backing.

U.S. Pat. No. 4,604,042 discloses a mold for producing an anisotropic magnet from a composition consisting essentially of magnetic powder and a binder. The mold includes a mold body, a cavity for molding the composition, yokes and first and second magnets on both sides of the yokes for preventing leakage of the magnetic field.

U.S. Pat. No. 4,557,582 discloses a magnet roll including magnet pieces adhesively secured to a supporting shaft to increase the magnetic flux density of a pole. The pieces are disposed do that they have repelling magnetic forces in the interface between the piece have the pole and the piece adjacent thereto.

U.S. Pat. No. 4,517,719 discloses a magnetic roll having a plurality of magnets integrally set fast with a retaining member to form a magnetic force generating part. The retaining member is made of a rigid synthetic resin or resin foam and a groove is provided outside of the magnetic force generating part.

In accordance with one aspect of the present invention, there is provided a mold for use in a molding machine for manufacturing a magnetic roll for use in an electrophotographic printing machine of the type having an electrostatic latent image recorded on a photoconductive member. The mold includes a body and an insert. The body defines a surface of the body. The insert is positioned at least partially against the surface of the body. The insert defines an inner surface of the insert. The inner surface is adapted to conform to at least a portion of the periphery of the roll. The insert may be replaced when worn and the body may be reused with a replacement insert.

In accordance with another aspect of the present invention, there is provided a method for manufacturing a magnetic roll for use in an electrophotographic printing machine of the type having an electrostatic latent image recorded on a photoconductive member is provided. The method includes the steps of providing a mold body, removably securing an insert at least partially within the mold body, placing a shaft in a mold cavity and molding a core in the mold cavity with the shaft in the cavity.

BRIEF DESCRIPTION OF THE DRAWINGS

The invention will be described in detail herein with reference to the following figures in which like reference numerals denote like elements and wherein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 3:
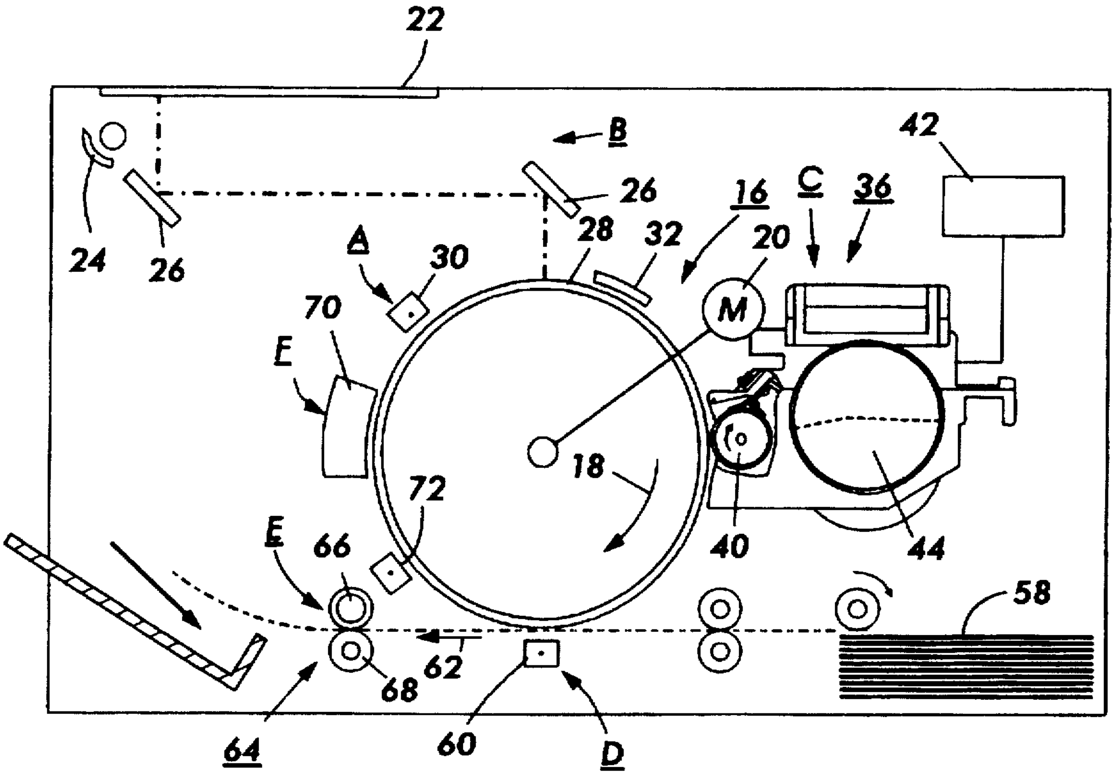
FIG. 3 is a schematic elevational view of an illustrative electrophotographic printing machine incorporating the multiple poled molded magnetic roll manufactured from the mold of FIG. 2.

For a general understanding of the illustrative electrophotographic printing machine incorporating the features of the present invention therein, reference is made to the drawings. In the drawings, like reference numerals have been used throughout to designate identical elements. FIG. 3 schematically depicts the various components of an electrophotographic printing machine incorporating the developing device of the present invention therein. Although the developing device of the present invention is particularly well adapted for use in the illustrative printing machine, it will become evident that the developing device is equally well suited for use in a wide variety of printing machines and are not necessarily limited in its application to the particular embodiment shown herein.

Referring now to FIG. 3, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document to be reproduced is placed on a platen 22, located at imaging station B, where it is illuminated in known manner by a light source such as a tungsten halogen lamp 24. The document thus exposed is imaged onto the drum 16 by a system of mirrors 26, as shown. The optical image selectively discharges surface 28 of the drum 16 in an image configuration whereby an electrostatic latent image 32 of the original document is recorded on the drum 16 at the imaging station B.

At development station C, a magnetic development system or unit, indicated generally by the reference numeral 36 advances developer materials into contact with the electrostatic latent images. Preferably, the magnetic developer unit includes a magnetic developer roll mounted in a housing.

Thus, developer unit 36 contains a developer roll 116. The roll 116 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the developer roll 116.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the which operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device 72 to enable removal therefrom. These particles are removed at cleaning station F. The vacuum assisted, electrostatic, brush cleaner unit 70 is disposed at the cleaner station F. The cleaner unit has two brush rolls that rotate at relatively high speeds which creates mechanical forces that tend to sweep the residual toner particles into an air stream (provided by a vacuum source), and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

Figure 1:
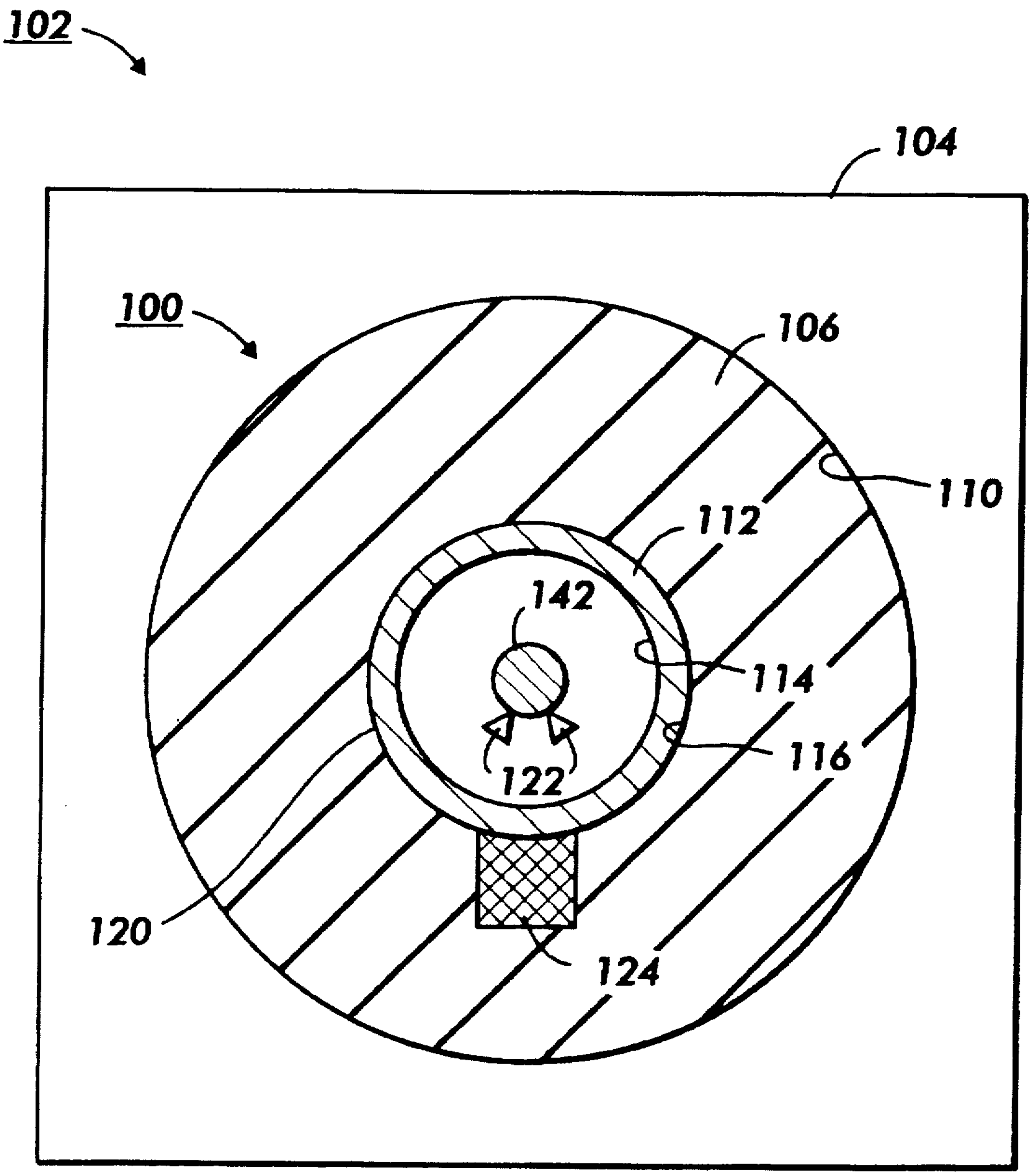
FIG. 1 is an elevational view of a removable insert mold according to the present invention for molding a multiple poled molded magnetic roll.

According to the present invention, referring to FIG. 1, a mold 100 is shown assembled into molding machine 102. The molding machine 102 may be any suitable molding machine capable of receiving moldable material and may be, for example, Model No. 600/200 VHRO provided by Engel Company, Guelph, Canada.

The mold 100 preferably is located within a support 104, preferably made of a suitable durable material, for example, tool steel. The mold 100 includes a mold body 106. The mold body 106 is made of any suitable durable material. Preferably, the mold body 106 is made of a nonmagnetic material, for example, Be/Cu. The mold body 106 may have any suitable shape. For example, as shown in FIG. 1, the mold body 106 has a cylindrical shape. The mold body 106 is matingly fitted into an opening 110 within the support 104.

According to the present invention and as shown in FIG. 1, the mold 100 includes an insert 112 located within the mold body 106. The insert 112 may be made of any suitable material, and in particular should be made of a non-magnetic material. An alloy of copper including beryllium is particularly suitable for this application. The insert 112 may have any suitable shape, but preferably has an inner periphery 114 which is representative of the outer periphery of the roll 40 (see FIG. 3).

Referring again to FIG. 1, for a roll 40 having a circular periphery, the insert 112 has an inner periphery 114 which is circular. The mold body 106 preferably has an inner periphery 116 with which outer periphery 120 of the insert 112 matingly fits.

The roll 40 may be supported in the developer unit 36 (see FIG. 3) in any suitable fashion. For example, the outer periphery of the roll 40 may have at its ends protrusions (not shown) which serve as journals for mounting the roll 40 to the developer housing 36.

Preferably, however the mounting of the roll 40 to the unit 36 is accomplished as shown in FIG. 1, by a shaft 142 which is positioned by supports 122 located in the mold 100. Molding material (not shown) is fed into the mold 100 and fills the cavity formed by inner periphery 114 of the insert 112. The molded material surrounds the shaft 142, with the molded material and shaft 142 forming roll 40 (see FIG. 3). Referring again to FIG. 1, preferably, the molding material is made of a ferrite material to provide a magnetic field within the roll 40. The ferrite material may be magnetized by a permanent magnet 124 located within the mold body 106 of the mold 100. Preferably the permanent magnet 124 is located adjacent the outer periphery 120 of the insert 112 so that the strength of the permanent magnet may be as great as possible to transfer sufficient magnetism to the roll 40.

While the mold 100 of FIG. 1 is a simple, inexpensive embodiment of the present invention, the mold 100 has a significant disadvantage in that removing a roll 40 from the mold 100 may be difficult. To ease the removal of the roll 40 from the mold 100, preferably, the roll 40 has a taper of, say for example, 0.010 inches per inch of roll length in order that the roll 40 may be axially removed from the mold 100.

Figure 2:
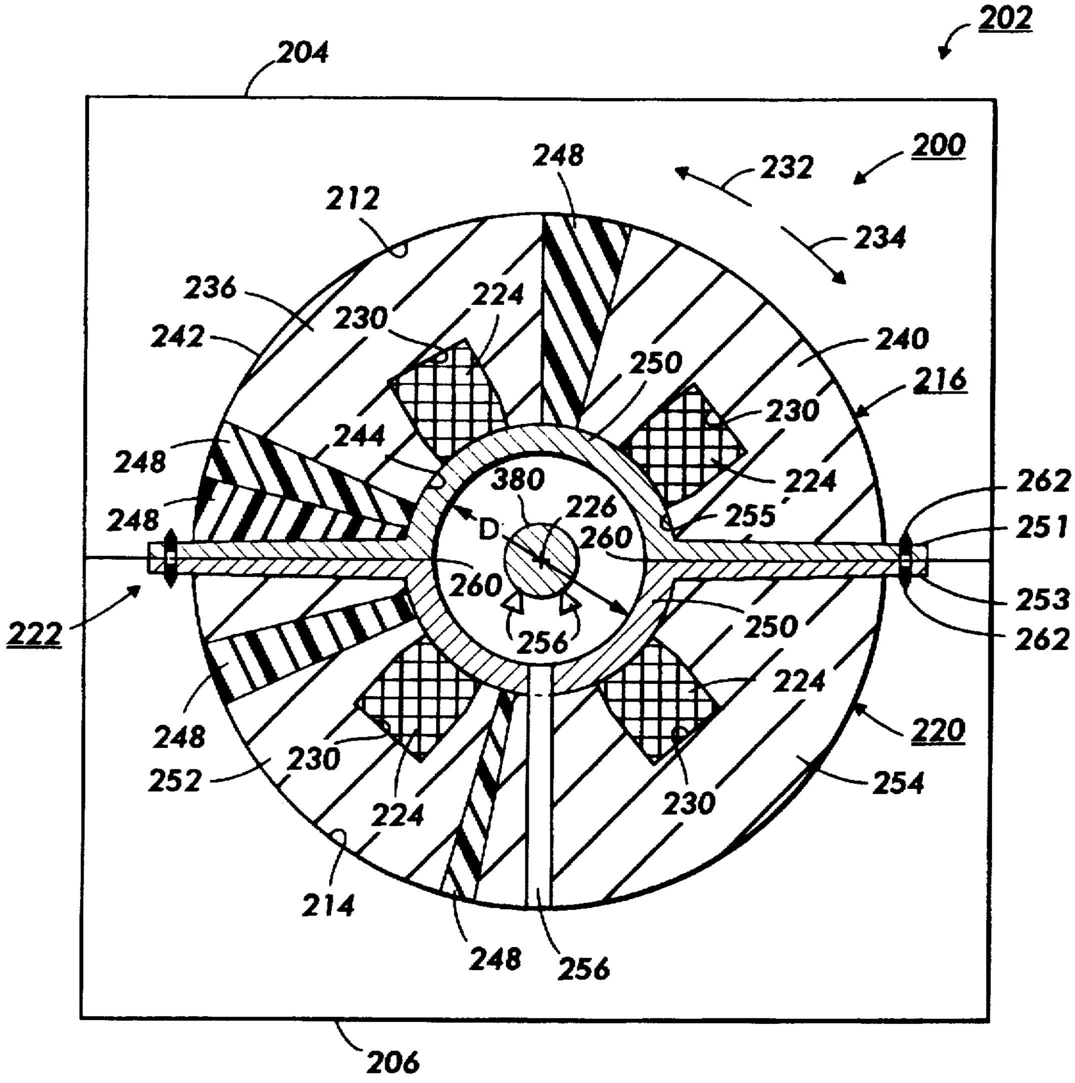
FIG. 2 is an elevational view of an alternate embodiment of a removable insert mold according to the present invention for molding a multiple poled molded magnetic roll having a two piece insert.

According to the present invention, and referring now to FIG. 2, another embodiment of the present invention is shown. In this embodiment mold 200 may be separated into two portions so that the roll may be easily removed between the portions of the mold 200.

The mold 200 may be adaptable to the molding machine (see FIG. 1). Referring again to FIG. 2, the mold 200 is supported by mold support 202. Mold support 202 includes a stationary mold support 204 as well as an ejector mold support 206. The stationary mold support 204 and the ejector mold support 206 may have any shape suitable for supporting the mold 200. For example, the stationary mold support 204 and the ejector mold support 206 may combine to have a generally rectangular shape as well as a generally uniform cross-section. The stationary mold support 204 and the ejector mold support 206 combine to form aperture 210 to which the mold 200 matingly fits. The aperture 210 may have any suitable shape, but for simplicity and particularly when used to mold circular cross-section parts, the aperture 210 is formed from two (2) generally semi-circular portions 212 and 214 in the stationary mold support 204 and the ejector mold support 206, respectfully.

According to the present invention and to permit the easy removal of the roll from the mold 200, the mold 200 includes two (2) separate portions, a first mold portion 216 in the form of a stationary mold and second mold portion 220 in the form of an ejector mold. The stationary mold 216 and the ejector mold 220 are made of any suitable durable material. For example, the stationary mold and ejector mold, 216 and 220, respectfully, are made from a metal alloy, for example, copper and beryllium.

To accommodate the abrasive wear caused by the ferrite material used to mold the magnetic roll, the mold 200 also includes an insert 222. The insert 222 is positioned between the stationary mold 216 and the ejector mold 220. As molding the magnetic rolls may cause wear to the insert 222, replacement inserts may be used to replace a worn insert with a new insert.

To provide a magnetic field to magnetize the material used to make the magnetic roll, the mold 200 preferably includes a permanent magnetic member 224. The magnetic member 224 may have any suitable shape, but as shown in FIG. 2, the magnetic member preferably has a generally rectangular shape and extends in a direction generally parallel to centerline 226 of the mold 200. The magnetic member 224 may be made of any suitable durable material, for example Samariam Cobalt manufactured by Magnet Sales and Manufacturing. To secure the magnetic members 224 within the mold 200, preferably, the magnetic members are positioned in a pocket 230 within the mold 200. The pocket 230 generally conforms to the magnetic member 224.

While magnetic members may be manufactured with a solitary magnetic pole, preferably, the magnetic member includes a plurality of magnetic poles. For example, the magnetic roll 240 of FIG. 4 has four (4) north poles and four (4) south poles. Referring again to FIG. 2, to generate a magnetic roll with four (4) north and four (4) south poles, the mold 200 includes four (4) magnetic members 224. As stated earlier, the relative position of the magnetic members 224 with respect to the periphery of the roll effects the operation of the transfer of the toner from the developer unit to the photoreceptor. Since it is very difficult to isolate the magnetic fields of the magnetic members 224, the magnetic members 224 interact with each other creating a positional shift in the resulting magnetic field of the roll that is molded in the mold 200 relative to the position of the magnetic member 224. It becomes, therefore, very difficult to position the magnetic members 224 in a proper position to accomplish a roll with magnetic fields in certain precise positions. For example, the applicants have found that the actual magnetic fields of a molded part may be as much as 10 degrees of angularity different than the respective centerlines of the magnetic members within the mold 200. It thus becomes advantageous to be able to position the magnetic members 224 about the mold 200 in order to provide an accurate positioning of the magnetic poles of the roll.

According to the present invention, the applicants have found that it is desirable to permit the magnetic members 224 to be rotatably positionable in the direction of first arrow 232 and second arrow 234 to accurately position the poles of the magnetic roll. To permit the rotation of the magnetic members 224 in the direction of arrows 232 and 234, preferably, the stationary mold 216 includes a stationary mold first mold segment 236 and a stationary mold second mold segment 240. The mold segments 236 and 240 are rotatably positionable about mold centerline 226.

The rotatable position of the stationary mold first mold segment 236 is accomplished by a first mold arcuate portion 242 about the outer-periphery of the segment 236 and second mold arcuate portion 244 about the inner periphery of the first mold segment 236. The first mold arcuate portion 242 and the second mold arcuate portion 244 have a centerline coincident with the mold centerline 226. Likewise, the stationary mold support 204 defines the semi-circular portion 212 which conforms to the first mold arcuate portion 242. Likewise, the insert 222 includes an insert arcuate portion 250, preferably a semi-circular portion, which conforms to the second mold arcuate portion 244. The first mold segment 236 and second mold segment 240 include magnetic pockets 230 into which the magnetic members 224 are matingly fitted. The magnetic members 224 may thus be rotatably positioned about the mold 200.

To secure the segments 236 and 240 in position, wedges 248 are positioned between adjacent segments 236 and 240 and between the stationary mold support and the insert 222. The wedges 248 may have different widths depending on the distance between and positions of adjacent segments 236 and 240.

Similar to the stationary mold first mold segment 236 and stationary mold second segment 240, preferably, the ejector mold 220 includes an ejector mold first mold segment 252 and an ejector mold second mold segment 254. Similar to the segments 236 and 240, the segments 252 and 254 include magnetic pockets 230 to which the magnetic members 224 are secured. The ejector mold first mold segment 252 and second mold segment 254 are, likewise, rotatably positioned about mold centerline 226 and are held in position by wedges 248.

To provide for the ejection of the molded magnetic roll from the mold 200, ejector pins 256 are preferably provided to physically separate the magnetic member from the ejector mold 220. The ejector pins 256 are preferably centrally located within the second mold portion 220.

The insert 222 for the mold 200 preferably includes a stationary cover plate 251 secured to the first mold portion 216 and an ejector cover plate 253 secured to the second mold portion 220. The ejector cover plate 253 and the stationary cover plate 251 are made of any suitable durable material. Preferably, the plates 251 and 253 are made of a non-magnetic metal, for example beryllium-copper. The plates 251 and 253 have the semicircular portion 250 which forms an inner periphery of the mold 200. The inner periphery 255 of the mold 200 defines a diameter "D" which is roughly equal to the outside diameter of the magnetic roll.

The plates 251 and 253 may each be made of a unitary piece. Alternatively the plates 251 and 253 may be made in strips each having a cross section as shown in FIG. 2. If the plates are for example 15 inches long along the centerline 226, the plate segments (not shown) may extend for five inches each. Adjacent segments would then be butted against each other. The segments would allow for smaller components to grind than a unitary design would allow. The smaller components would permit more accurate and flatter grinding of the flat portions of the plates 251 and 253, permitting less material to pass at parting line 260.

Supports 256 are positioned at the opposed ends of the mold 200. The supports 256 serve to support the magnetic roll. The portions of the plates 251 and 253, where the plates 251 and 253 contact at the circular portion 250, define a parting line 260. The parting line 260 represents the critical wear portion of the insert 222. As the parting line 260 wears, a protrusion or raised area forms on the periphery of the magnetic roll. This protrusion or raised area requires subsequent machining. It is therefore important to keep the insert 222 in good condition so that the parting line protrusion may be minimized. Thus, by utilizing the present invention, the insert 222 may be easily replaced maintaining the like-new condition of the parting line 260.

The cover plates 251 and 253 are secured to the stationary mold support 204 and the ejector mold support 206, respectively. The plates 251 and 253 may be secured in any suitable method such as by gluing, rivets, but preferably are removably secured by fasteners, in the form of screws 262.

Figure 4:
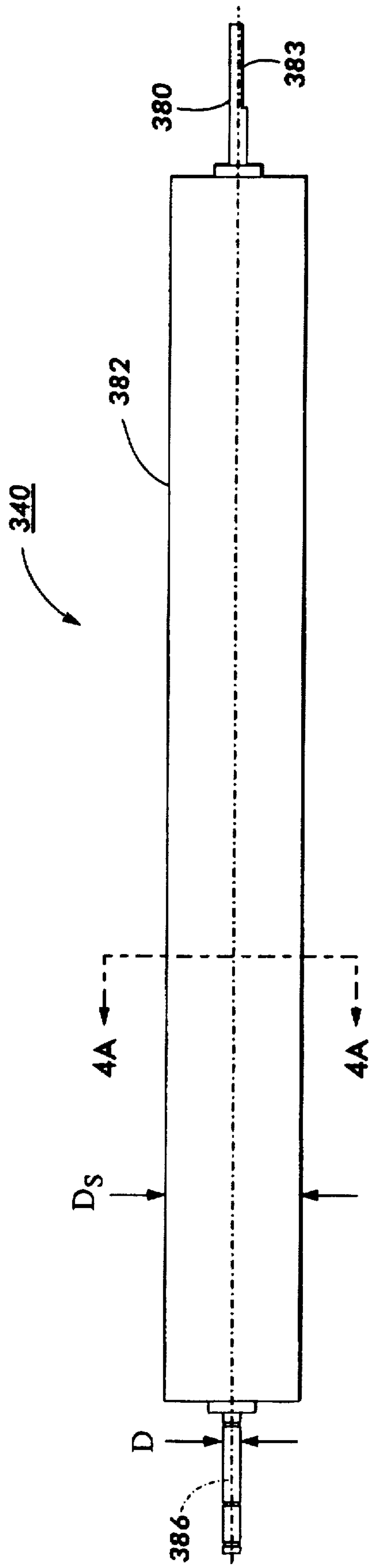
FIG. 4 is an elevational view of a multiple poled molded magnetic roll manufactured from the mold of FIG. 2.

Referring now to FIG. 4, a magnetic roll 340 manufactured for example on the mold 200 of FIG. 2 is shown. The magnetic roll 340 includes a core 382 positioned about a shaft 380. As stated earlier, the shaft 380 is placed in the mold 200 (see FIG. 2) against supports 256 and the core 382 is molded about the shaft 380.

Referring again to FIG. 4, the shaft 380 is made of any suitable durable material capable of supporting the core 382. For example, the shaft may be made of a metal. To avoid having the shaft attracted to the permanent magnets and to the carrier granules, the metal is preferably a non-magnetic material. An example of such a suitable material is SUS 303. The shaft may have any shape, but typically has a cylindrical shape having a diameter D of sufficient size to be capable of supporting the core 382. The shaft 380 preferably has a feature for angularly orienting the position of the magnet poles in the roll with the shaft 380. For example the shaft includes a "D" flat 383 which mates with a mating feature (not shown) on the mold 200. The "D" flat 383 serves to provide an absolute magnetic pole location for the core 382 with respect to the shaft 380 in the mold and to provide an absolute magnetic pole location for the core 382 with respect to the shaft 380 when assembled into the developer unit.

The core 382 is positioned about shaft 380. The core 382 is preferably molded onto the shaft 380. The core 382 has a diameter $D_s$ of approximately 1.7 inches for a development roll 300 (see FIG. 5) having a diameter of approximately 2 inches. The core 382 has a centerline which is coincident with centerline 386 of shaft 380. While the invention may be practiced with a single pair of north and south poles, preferably the magnetic roll 340 includes a plurality of poles.

Figure 4A:
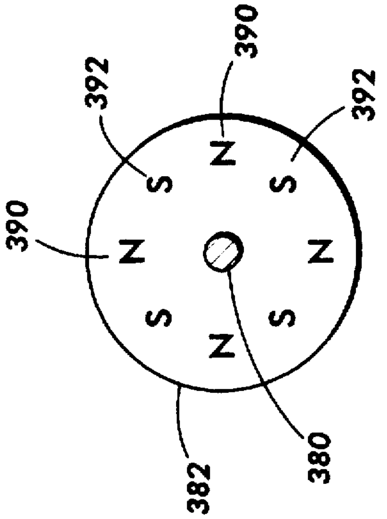
FIG. 4A is an sectional view along the line 4A—4A in the direction of the arrows of the multiple poled molded magnetic roll of FIG. 4.

For example, referring to FIG. 4A, the magnetic roll 340 includes four (4) spaced-apart north poles 390 and separated by four (4) spaced-apart south poles 392. As stated earlier, the relative position of the north poles 390 and the south poles 392 may be altered by rotating the position of the mold segments 236 and 240 (see FIG. 2).

Referring again to FIG. 4, the core 382 may be made of any suitable, durable, moldable, or castable material. For example, the core material may be a polyester, a nylon, an acrylic, a urethane, or an epoxy. The core material may be made of any castable resin that is castable at low pressures. This core material may be fortified with fillers, for example, milled glass, glass fibers, conductive fillers, or reinforcements. Preferably, the core 382 includes ferrite material which is magnetizable.

Figure 5:
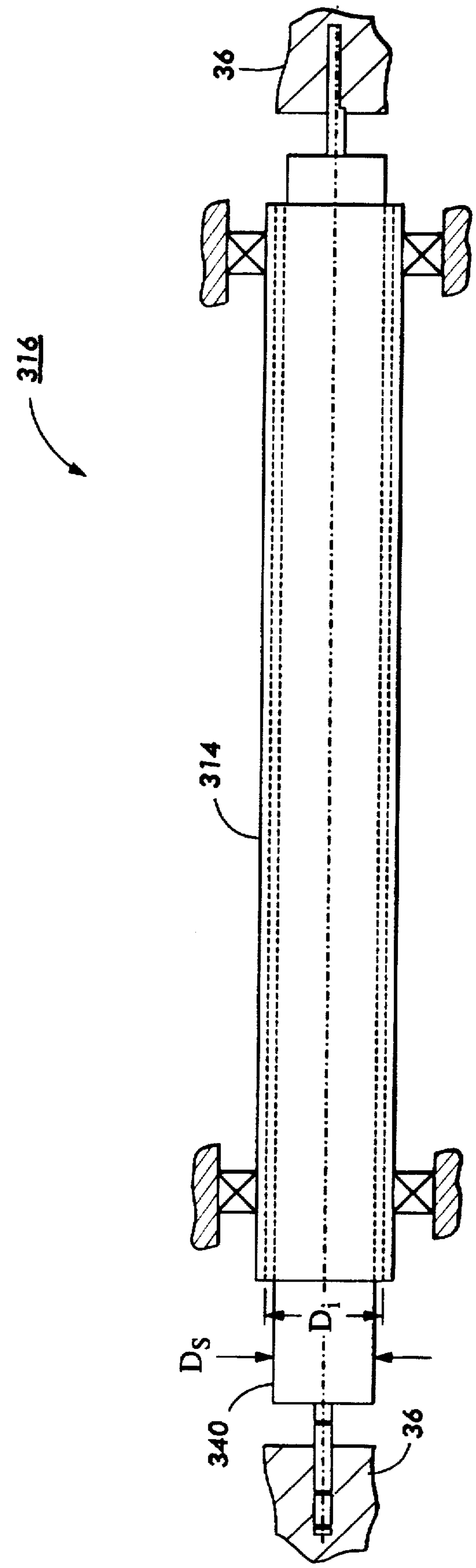
FIG. 5 is an elevational view of the multiple poled molded magnetic roll of FIG. 4 assembled in a development sleeve to form a developer roll.

Referring now to FIG. 5, the magnetic roll 380 is shown assembled within a sleeve or tube 314 to form the developer roll 316. The tube 314 may be made of any suitable, durable, non-peril magnetic material, for example, aluminum or plastic.

The tube 314 has an inner diameter "$D_i$" which is slightly larger than the diameter "$D_s$" of the magnetic roller 340. The tube 314 and the magnetic roller 340 serve to form the developer roll 316 which is typically an assembly. The magnetic roll 316 may operate by either a stationary tube 114 having a rotating magnetic roll 340 located therein, or by having a rotating tube 314 rotating about a fixed magnetic roll 340. Preferably, however, the magnetic roll 340 is fixed. The tube 314 is rotatably secured to the developer housing 36 and is driven by a power source (not shown) in an appropriate direction to advance toner to the photoreceptor. The magnetic roll thus advances the developer material around the periphery of the tube 314 toward the photoreceptive surface of the drum.

Figure 6:
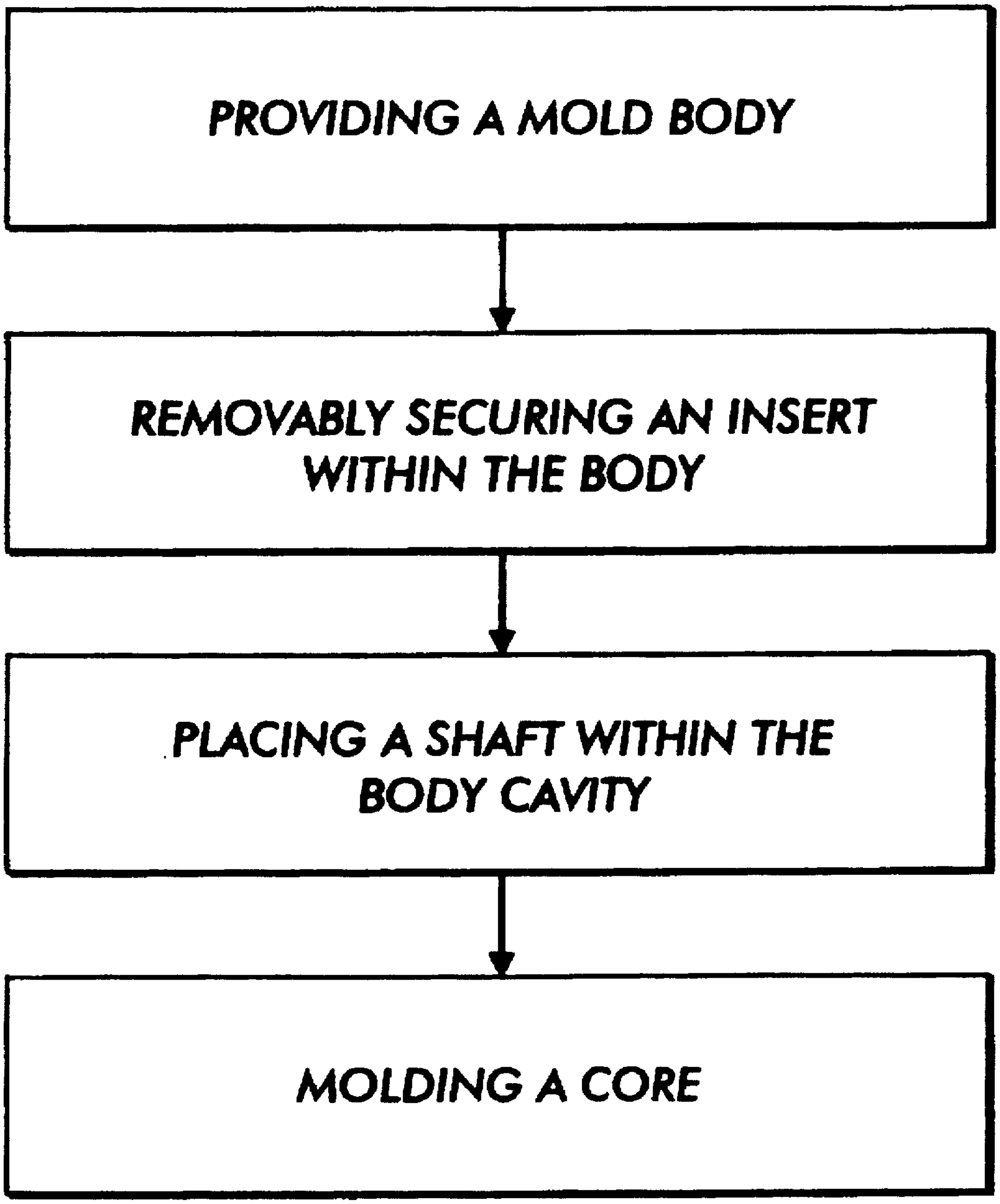
FIG. 6 is a block diagram of a process for manufacturing the multiple poled molded magnetic roll of FIG. 4.

Now referring to FIG. 6, a process is shown for manufacturing the magnetic 340 of FIG. 2. The process includes the first step of providing a mold body. A second step includes removably securing an insert at least partially within the mold body. A third step provides for placing a shaft in a mold cavity. The fourth step provides for molding a core in the mold cavity with a shaft in the cavity.

By providing a mold for a magnetic roll with a removable insert, the worn insert may be replaced at a lower cost than replacing the entire mold.

By providing a mold for a magnetic roll with stationary and ejector halves, and with inserts over the ejector and stationary halves, the inserts may be replaced providing for less expensive inserts to be replaced and permitting and simplifying the mold repair so that mold costs and downtime may be reduced.

By providing a magnetic roll with segments which are rotatably positioned within the mold, magnetic rolls may be provided with poles in various positions along the periphery of the roll without utilizing individual separate molds for each configuration.

By providing a mold for a magnetic roll with rotatably positionable magnets, the positions of the magnets within the magnetic roll may be shifted and optimized to provide for a more effective magnetic roll.

By providing a mold for a magnetic roll with replaceable inserts, the thickness of the insert may be minimized to permit the use of less powerful magnets within the magnetic mold that would be required for a thicker embodiment of the magnet within the mold.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method for manufacturing a magnetic roll for use in an electrophotographic printing machine of the type having an electrostatic latent image recorded on a photoconductive member, said method comprising the steps of:

providing a mold body, the mold body defining an internal periphery thereof, the mold body including a first mold portion and a second mold portion adjacent the first mold portion;

positioning a permanent magnet adjacent the mold body;

removably securing an insert assembly at least partially within the mold body, the insert assembly forming a mold cavity therewithin, the insert assembly including a first insert being secured to the first mold portion and a second insert being secured to the second mold portion, the second insert being separable from the first insert;

placing a shaft in the mold cavity;

molding magnetizable material to form a core in the mold cavity with the shaft in the cavity, the shaft and the core forming the magnetic roll;

separating the first insert from the second insert; and removing the magnetic roll from the mold cavity.

2. The method of claim 1, wherein the positioning step comprises positioning the magnet between the mold body and the insert.

3. The method of claim 2, further comprising the step of positioning a second permanent magnet adjacent the mold body and spaced from the first mentioned permanent magnet.

4. A method for manufacturing a first magnetic roll and a second magnetic roll for use in an electrophotographic printing machine of the type having an electrostatic latent image recorded on a photoconductive member, said method comprising the steps of:

providing a mold body, the mold body defining an internal periphery thereof, the mold body including a plurality of mold body portions, each mold body portion including a permanent magnet and the mold body including a plurality of mold body spacers;

removably securing an insert at least partially within the mold body, the insert forming a mold cavity therewithin;

placing a first shaft in the mold cavity;

molding magnetizable material to form a first core in the mold cavity with the first shaft in the cavity, the first shaft and the first core forming the first magnetic roll;

removing the first magnetic roll from the mold cavity;

repositioning the relative positions of the mold body portions and the mold body spacers with respect to each other;

placing a second shaft in the mold cavity;

molding magnetizable material to form a second core in the mold cavity with the second shaft in the cavity, the second shaft and the second core forming the second magnetic roll so that locations of magnetic poles on the second magnetic roll may be altered with respect to those of the first magnetic roll.

5. The method of claim 4, wherein the step of providing a mold body comprises the step of providing a plurality of mold body portions and a plurality of mold body spacers, each mold body portion having an arcuate outer periphery and each mold body spacer having an arcuate outer periphery; and wherein the step of providing a mold body comprises the step of swiveling at least one of the mold body portions and at least one of the mold body spacers with respect to each other.

6. A method for manufacturing a magnetic roll for use in an electrophotographic printing machine of the type having an electrostatic latent image recorded on a photoconductive member, said method comprising the steps of:

providing a plurality of mold body portions and a plurality of mold body spacers, each mold body portion having an arcuate outer periphery and each mold body spacer having an arcuate outer periphery, at least one of the mold body portions and at least one of the mold body spacers swivelable with respect to each other the mold body portions serving to form a body mold, the mold body comprising a permanent magnet and defining an internal periphery thereof;

removably securing an insert at least partially within the mold body, the insert forming a mold cavity therewithin;

placing a shaft in the mold cavity; and molding magnetizable material to form a core in the mold cavity with the shaft in the cavity, the shaft and the core forming the magnetic roll.

7. The method of claim 6, wherein the step of providing a mold body comprises the step of providing a plurality of mold body portions, each of the mold body portions including a permanent magnet associated therewith.

8. A method for manufacturing a first magnetic roll and second magnetic roll for use in an electrophotographic printing machine of the type having an electrostatic latent image recorded on a photoconductive member, said method comprising the steps of:

providing a plurality of mold body portions to form a body mold, the mold body defining an internal periphery thereof;

positioning a permanent magnet adjacent the mold body and between the mold body and an insert to be secured therein;

positioning a second permanent magnet adjacent the mold body and spaced from the first mentioned permanent magnet;

removably securing the insert at least partially within the mold body, the insert forming a mold cavity therewithin;

placing a first shaft in the mold cavity;

molding a first core in the mold cavity with the first shaft in the cavity, the molding step including inserting a magnetizable material into the mold cavity to form the first magnetic roll with poles adjacent the permanent magnets;

measuring the position of the poles on the first magnetic roll;

repositioning at least one of the permanent magnets;

placing a second shaft in the mold cavity;

molding a second core in the mold cavity with the second shaft in the cavity, the molding step including inserting a magnetizable material into the mold cavity to form the second magnetic roll, the repositioning of the permanent magnets causing the relative position of the poles between the first magnetic roll and the second magnetic roll to move.

9. A method for manufacturing a first magnetic roll and a second magnetic roll for use in an electrophotographic printing machine of the type having an electrostatic latent image recorded on a photoconductive member, said method comprising the steps of:

providing a plurality of mold body portions to form a mold body, the mold body defining an internal periphery thereof, at least a portion of the mold body portions including permanent magnets associated therewith;

removably securing an insert at least partially within the mold body, the insert forming a mold cavity therewithin;

placing a first shaft in the mold cavity;

molding a first core with a magnetizable material in the mold cavity with the shaft in the cavity, the first core and the first shaft forming the first magnetic roll, the permanent magnets cooperating with the magnetizable material to form poles on the first core;

removing the first magnetic roll from the mold cavity;

measuring the position of the poles on the first core;

repositioning at least some of the mold body portions to reposition the permanent magnets;

placing a second shaft in the mold cavity;

molding a second core with a magnetizable material in the mold cavity with the shaft in the cavity, the second core and the second shaft forming the second magnetic roll, the permanent magnets cooperating with the magnetizable material to form poles on the second core; and removing the second magnetic roll from the mold cavity.

* * * * *